(12) United States Patent
Adcock (10) Patent No.: US 7,269,825 B1
(45) Date of Patent: Sep. 11, 2007

(54) METHOD AND SYSTEM FOR RELATIVE ADDRESS TRANSLATION

(75) Inventor: James W. Adcock, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 508 days.

(21) Appl. No.: 10/330,994

(22) Filed: Dec. 27, 2002

(51) Int. Cl.
*G06F 9/45* (2006.01)

(52) U.S. Cl. ............................ 717/136; 711/3; 711/113; 711/202; 711/206

(58) Field of Classification Search ................. 717/139, 717/136; 711/139–220, 3, 113; 712/219–244; 709/206, 245
See application file for complete search history.

(56) References Cited

U.S. PATENT DOCUMENTS

| | | | | |
|---|---|---|---|---|
| 5,680,568 A | * | 10/1997 | Sakamura | 711/220 |
| RE36,766 E | * | 7/2000 | Krauskopf | 711/203 |
| 6,256,715 B1 | * | 7/2001 | Hansen | 711/163 |
| 6,360,314 B1 | * | 3/2002 | Webb et al. | 712/219 |
| 6,754,784 B1 | * | 6/2004 | North et al. | 711/145 |
| 6,934,832 B1 | * | 8/2005 | Van Dyke et al. | 712/244 |
| 7,136,932 B1 | * | 11/2006 | Schneider | 709/245 |
| 2002/0169842 A1 | * | 11/2002 | Christensen et al. | 709/206 |
| 2005/0086650 A1 | * | 4/2005 | Yates et al. | 717/139 |

\* cited by examiner

*Primary Examiner*—Meng-Al T. An
*Assistant Examiner*—Mark P. Francis
(74) *Attorney, Agent, or Firm*—Charles A. Johnson; Richard J. Gregson; Hollingsworth & Funk, LLC (57) ABSTRACT

A method and system to provide improved operation of a software emulated platform through the use of a relative address translation cache containing a plurality of cache sets. Each address translation contained within the relative address translation cache contains a Base Descriptor Register selection, a relative address limit check, an access privilege check, generation of an absolute address and a real address, and breakpoint discovery.

22 Claims, 6 Drawing Sheets

METHOD AND SYSTEM FOR RELATIVE ADDRESS TRANSLATION

FIELD OF THE INVENTION

The present invention generally relates to address translation, and more particularly, to software emulated address translation using a relative address cache.

BACKGROUND OF THE INVENTION

The computing industry, like so many other technologies, has seen and continues to experience quantum improvements in design, efficiency, memory management, speed and many other features that are characterized as enhancing the computer's operation. Many of the improvements have centered around the Central Processing Unit (CPU) and its interaction with the Operating System (OS) executed by the CPU.

One area of improvement concerning the operation of the CPU has led to vast improvements in memory management and the concept of the virtual memory system. The virtual memory system was adopted in large part due to the limitations that fixed, physical memory space presented to OS developers. Virtually all software applications executing within the parameters of the CPU utilize physical memory space for temporary storage of machine language program instructions and operands used by the machine language program. The earlier OS designs strictly limited memory usage to the physical memory available to the CPU. The physical memory available to the CPU being realized by either Random Access Memory (RAM) or magnetic disk storage units, the access to which severely limited or even prohibited the existence of a multi-tasking OS, not to mention a system comprising multiple CPUs operating in parallel.

A number of techniques have been created over the years to handle limited physical memory situations. One such technique was the overlay system, in which a program was divided into discrete segments where only one of the segments could be accessed at one time. Whenever a different segment of program was needed, it was simply loaded into the physical memory space available to the CPU, and loaded over the top of the old program segment previously executed.

A second technique that has become prevalent today is the use of virtual memory space. Virtual memory expands on the overlay concept and divides all available memory into a set of pages. In general, the pages are restricted to one, or perhaps a few, possible page sizes. Instead of having only a single overlay region, multiple overlay regions may be created, where one overlay region is created for each page of memory available. The initial offering of overlays required that the application programmer be diligent in his determination of the layout of the data. Over time, however, standard software packages became available to manage the overlay map and eventually, the overlay management functionality migrated into the OS.

Virtual memory also establishes the concept of address spaces. Prior to virtual memory, a single address space was defined by the number of address bits available to access the memory space. A 16-bit address bus, for example, allowed access to an address space of only 64 kilobytes (KB). Some architectures allowed the separation of instruction code from instruction data so that the combined address space could be doubled to 128 KB. These architectures, however, still limited the software applications to the absolute maximum of 64 KB, not including the address space required for the OS itself.

A level of indirection was added by the use of virtual memory to the application space concept, which allowed the OS to maintain a multitude of different address spaces, only one of which being active at any given time. Separate address spaces for each application yielded the protection of the memory owned by the application because each application was confined to its own virtual memory space. Additionally, the advent of relatively inexpensive magnetic storage media increased the amount of memory available to the CPU and allowed the CPU to swap data between RAM and magnetic storage in order to simulate a much larger physical memory space and thus a much larger virtual memory space.

A CPU running in virtual memory mode receives addresses which are regarded as virtual addresses and are required to be converted into a physical address pointing to a physical memory location. For example, a CPU may receive an instruction pointer, which points to an address location of the next instruction to execute of a particular user program. The address location, however, is not the physical address location containing the instruction being executed, but is rather a virtual address. Before fetching the instructions to be executed, the CPU must translate the virtual address to a physical address and then fetch the contents of the physical memory from the physical address. The address translations may be stored in a cache memory, which allows the CPU to track the latest address conversions performed. If, for example, a virtual address translation has already been performed for the next instruction fetch, then the translation process need not be repeated. Instead, an address translation lookup into the translation cache is all that is required to obtain the address for the next operation to be performed.

If the translation cache does not contain the necessary information, then the memory management portion of the CPU must perform the required address translation. Memory management systems may use a paging system to calculate the physical address from the virtual address. That is to say, that the CPU utilizes page table support to determine which one of many page tables may contain the cached address translation. The directory page table may consist of a set of entries, each pointing to a page table. Each page table entry in turn consists of a number of entries, which points to a page of physical memory. The CPU, therefore, looks at the virtual address as a three-part address: 1.) A directory offset; 2.) A page table offset; and 3.) A page offset to determine the physical address from the virtual address.

Prior art address translation schemes use a hardware based page table implementation to perform comparisons on virtual memory ranges to speed up the identification of which page table contains the translation of the virtual address of interest. That is to say, that each page table contained a lower virtual memory limit and an upper virtual memory limit. A pair of comparators, therefore, could be used to simultaneously compare the lower and upper limits of two page tables to quickly isolate which, if any, page table contained the address translation of the virtual address of interest. If neither of the two page tables contained the address translation, then a miss would be recorded for the particular page table pair and a new page table pair would then be simultaneously compared, and so on. The hardware implementation, however, requires dedicated registers and comparators, which are not available in a software emulation environment. When the hardware architecture of the CPU is required to be emulated, which is often the case during user program testing and troubleshooting, a software alternative to the hardware address translation is required. Translation path lengths become troublesome for the software alternative due to the sequential operation of the software emulated address translation function.

A need exists, therefore, for a software emulated address translation technique that substantially reduces the translation path lengths required by the technique and thus accelerates the overall operation of the software emulated platform.

SUMMARY OF THE INVENTION

The present invention is directed to an emulated computer system and method for generating and using an address translation cache.

In accordance with one embodiment of the invention, a method is provided for using a relative address translation cache in a software emulated computing system. The method comprises locating a cache index corresponding to a relative address value, comparing a validity key received from an emulated CPU to a validity lock associated with the cache index, and deriving an absolute address from the relative address value using the relative address cache.

In accordance with another embodiment of the invention, a hardware emulation system is presented. The hardware emulation system comprises an emulated CPU, an emulated memory management unit coupled to the emulated CPU, and an address translation cache coupled to the emulated CPU and the emulated memory management unit, wherein the emulated CPU invalidates the address translation cache by changing a value of a validation key.

In accordance with another embodiment of the invention, a method of calculating a real address translation of a relative address in a software emulated computer system is presented. The method comprises selecting a cache set, defining boundary limits of a cache block within the cache set, defining access rights to the cache block, generating an indication of a breakpoint within the cache block, and generating a real address from the relative address.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
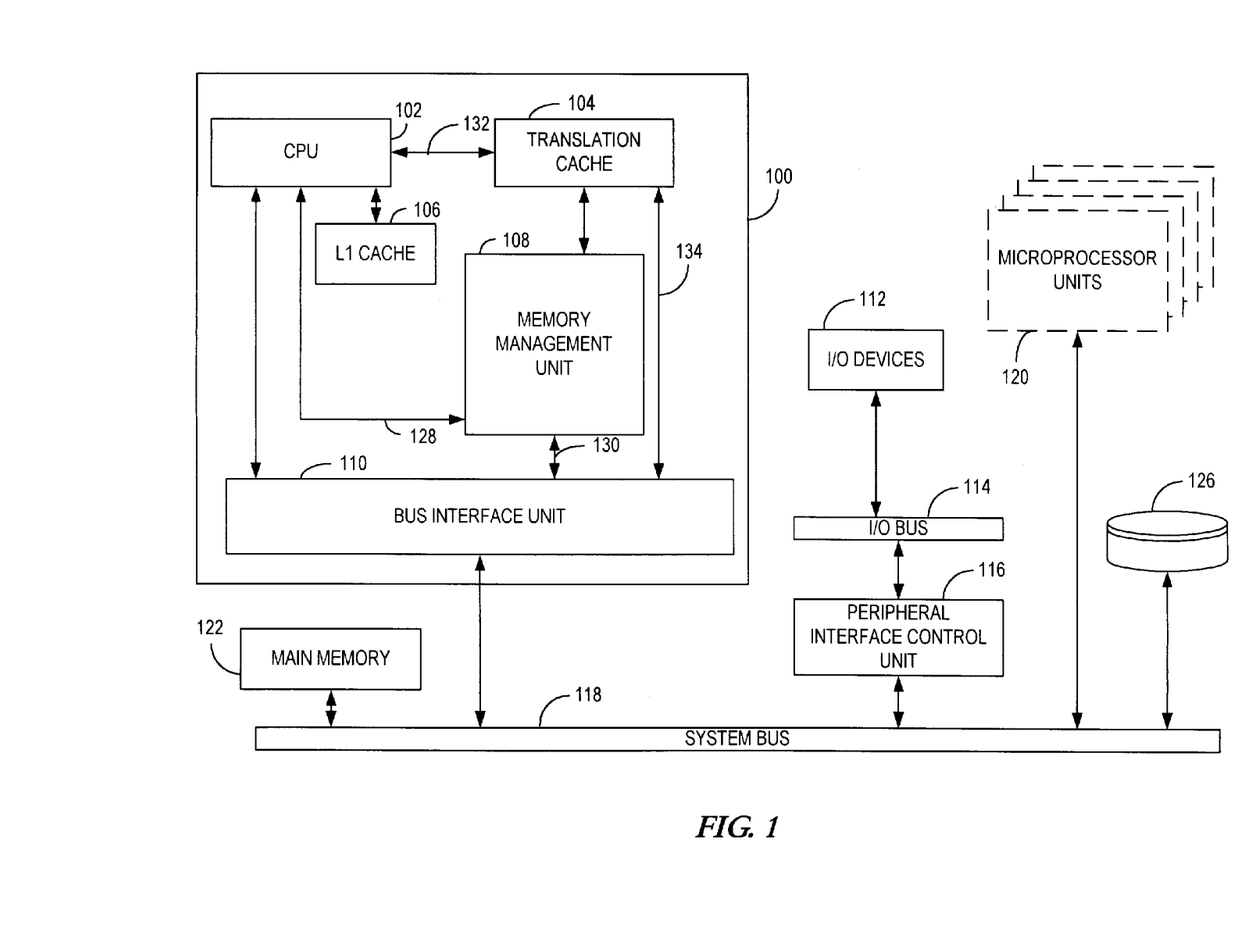
FIG. 1 is a block diagram of a typical computing platform.

FIG. 1 illustrates a block diagram of a typical hardware computing platform. Microprocessor 100 contains CPU 102, L1 cache 106, translation cache 104 and memory management unit 108. Bus interface unit 110 interconnects microprocessor 100 with system bus 118. System bus 118 interconnects main memory 122, peripheral interface control unit 116, hard disk 126, and microprocessor units 120. Microprocessor units 120 denote an optional multi-processor configuration, in which any number of micro processing units similar to microprocessor 100 may be interconnected in parallel computing applications. I/O bus 114 interconnects I/O devices 112 to peripheral interface control unit 116 for interaction with microprocessors 100 and 120. I/O devices 112 may include any number of peripherals including a magnetic storage device, such as a tape drive, video monitor, keyboard, communications network, and I/O expansion slots, to name only a few.

Main memory 122 may be implemented using Dynamic Random Access Memory (DRAM), for example, and L1 cache 106 may be implemented using Static RAM (SRAM), which is generally faster than the DRAM used for main memory 122. Hard disk 126 may be implemented using a magnetic device and may constitute what is often referred to as secondary memory.

The memory used in FIG. 1 is set up in a memory hierarchy in which L1 cache 106 and main memory 122 each exist on a first hierarchical level. Another level of cache, L2 cache (not shown), may also exist in the first hierarchical level and may be addressable through system bus 118. The design objective of these memories being such that the cache and main memories are to support CPU 102 with a minimum of delay. A second level of memory in the hierarchy may be set up using main memory 122 and hard disk 126. Although main memory 122 and hard disk 126 are distinctly different memory entities, their management by the OS is such that they may be seen as exactly the same memory space to user level or executive level code. The term virtual memory is then used to describe main memory 122 and secondary memory 126 when it is seen by the user program as a single, large, and directly addressable memory. Generally speaking, there are three reasons to use virtual memory. First, virtual memory is used to free user programs from the need to carry out storage allocation and to permit efficient sharing of the available memory space among different users. Second, virtual memory is used to make programs independent of the configuration and capacity of the physical memory present for their execution and to allow, for example, seamless overflow from main memory into secondary memory when the capacity of the main memory is exceeded. Third, virtual memory is used to maximize the access times and cost per bit that are possible with a memory hierarchy.

In operation, CPU 102 may execute a user level instruction which involves several steps. The steps may include fetching an instruction from main memory 122, decoding the instruction's opcode and reading from main memory 122 any operands required by the instruction, unless the operands are already loaded in the internal registers of CPU 102 (not shown). The instruction is then executed via a register to register operation using an appropriate functional unit of CPU 102, such as a fixed point adder, and then the results of the operation are written to main memory 122 unless retained in the internal CPU registers. Each time an instruction is fetched from main memory 122 or secondary memory 126 and each time an operand is either fetched from or written to main memory 122 or secondary memory 126, an address translation is required to convert from virtual addressing at interface 128 and 132 to physical addressing at interface 130 and 134.

The set of virtual memory locations that a program can reference is that program's relative address space. In order to execute the program on any particular computer, the program must be mapped to a physical address space defined by main memory 122 or secondary memory 126, or the like. The process of mapping is known as address translation or address mapping and has conventionally been implemented using hardware, or at least hardware assisted techniques.

Memory Management Unit (MMU) 108 is one such implementation of address translation. MMU 108 receives virtual address information from CPU 102 via interface 128, generally consisting of a virtual base address and a virtual base address offset. MMU 108 utilizes the virtual address information as a table lookup to obtain the required physical memory address required to either fetch or place data from/to main memory 122 or secondary memory 126. A history of prior address translations is stored in translation cache 104, in order to prevent a redundant address translation for a memory access that has already been performed by MMU 108. If an instruction needed by CPU 102 is on the same page as the last instruction fetch, for example, then the address translation for that page has already been calculated and cached into translation cache 104. The instruction fetch by CPU 102 would bypass MMU 108 and access translation cache 104 directly via 132 for the physical memory address required to complete the instruction fetch. The instruction fetch then being implemented via interface 134, whereby MMU 108 is bypassed due to the cached address translation.

Figure 2:
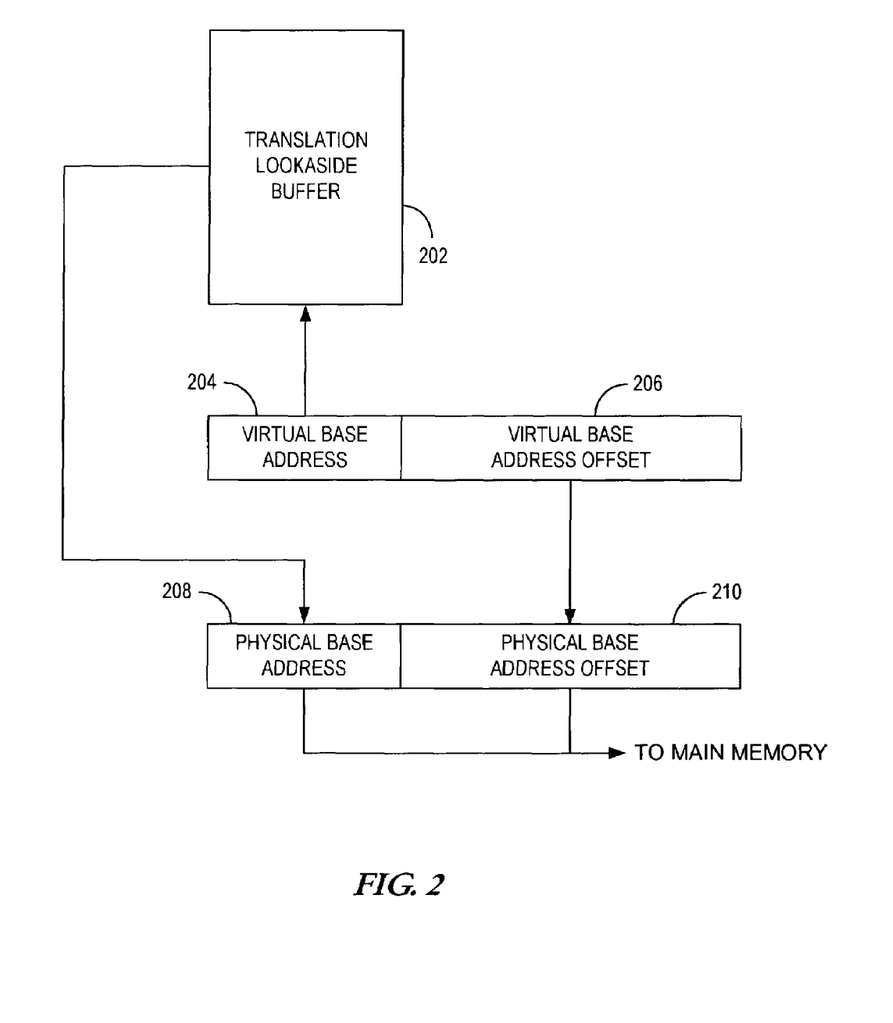
FIG. 2 is a functional block diagram of a typical address translation technique using a table lookup.

FIG. 2 illustrates a high level block diagram of a typical address translation technique, whereby a Translation Lookaside Buffer (TLB) 202 is used as a table lookup function. TLB 202 receives virtual base address 204, which acts as an index into TLB 202 to produce physical base address 208. Since blocks of memory addressed by either virtual address 204 or physical address 208 are usually of a fixed size, e.g., fixed page lengths, there is no requirement to convert a virtual base address offset 206 before transferring into physical base address offset 210. Once virtual base address 204 has been transferred from TLB 202 into physical base address 208 and once relative base address offset has been directly transferred into physical base address offset 210, the complete physical address is formed and is ready for use. The physical address formed, for example, may be applied to bus interface unit 110 of FIG. 1 for subsequent memory access from main memory 122 or secondary memory 126.

The basic unit of information for swapping purposes in a multi-level memory is a fixed-size block called a page. Pages are allocated to page-sized storage regions called page frames and are easily managed because pages provide fixed length storage blocks that are conveniently swappable. One advantage of using paging is that data transfer between memory levels is simplified, since an incoming page may be mapped to any available page frame. In a pure paging system, each relative address consists of a relative page address and a relative page address offset. TLB 202 of FIG. 2 may, therefore, be referred to as a page table whereby virtual base address 204 presented to TLB 202 represents the page index or absolute address input into the page table and the physical base address 208 represents the page frame, or physical/real address output, from the page table.

Figure 3:
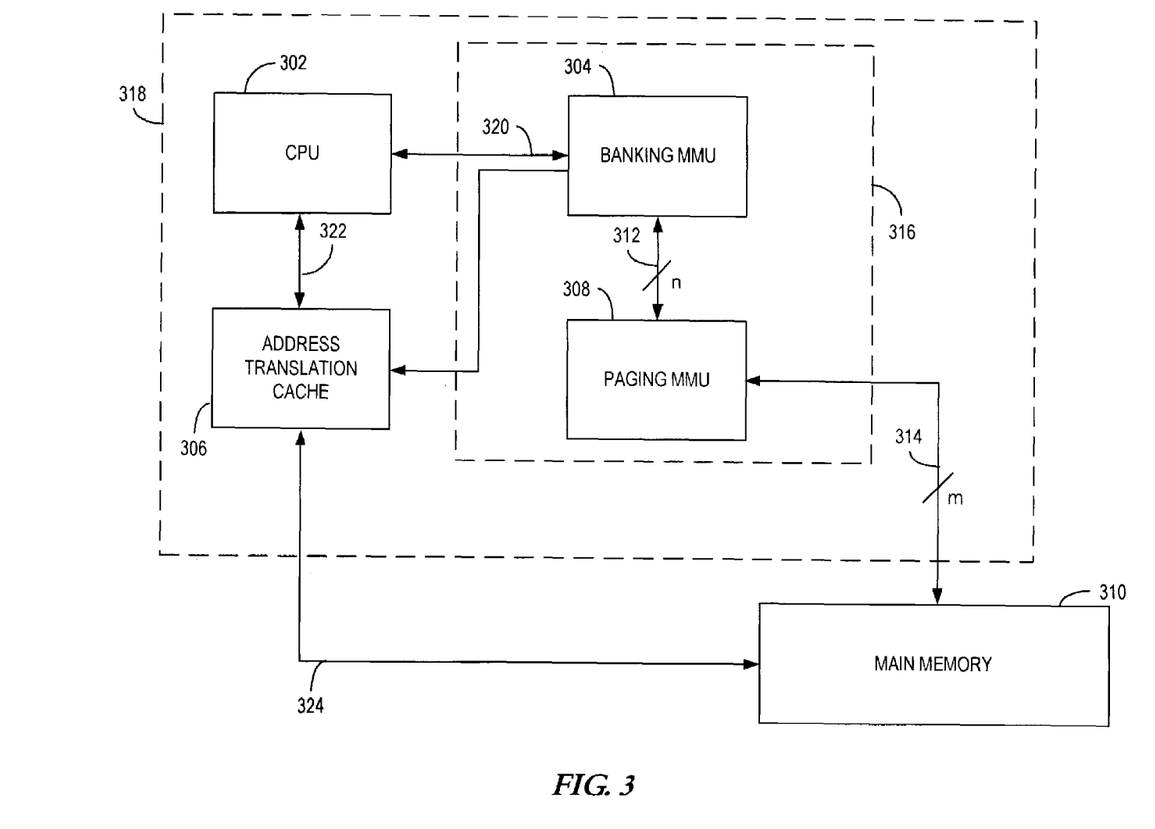
FIG. 3 is a functional block diagram of an address translation unit according to the present invention.

FIG. 3 illustrates an address translation unit functional block diagram in accordance with the present invention. Block 318 represents software emulated versions of equivalent hardware blocks as illustrated in FIG. 1. CPU 302, for example, may be a software emulation of CPU 102 as illustrated in FIG. 1. Likewise, MMU 316 may be a two-level, software equivalent of MMU 108 in FIG. 1. Address translation cache 306 is the software emulated equivalent to translation cache 104 of FIG. 1.

The emulation of a hardware platform involves the interpretation of the emulated platform's instructions located in the emulated main storage. The execution requires a read of the instruction from the main specific area of the main storage as specified by MMU 316. A program counter maintained within the emulated CPU has the address, which must be translated from a relative address to an absolute address. In addition, MMU 316 determines relative address limits for the specific access as well as verifying access permissions. The absolute address is translated to a real address using Paging MMU 308. Each emulated instruction that references Main Memory 310 is under control of MMU 316, requiring the calculation of a relative address, which then must be limits checked, access permissions verified, translated to an absolute address, and finally translated to a real address using Paging MMU 308. The emulation may be executed on any computing platform, such as for example, an Intel processor based platform executing a Windows NT operating system.

The high level operation of the address translation unit of FIG. 3 is that a translation of a virtual/relative address provided at interfaces 322 or 320 results in translation to a physical/absolute address applied to interfaces 324 or 314, respectively. MMU 316 may be comprised, for example, of a first level of memory management implemented by banking MMU 304 and a second level of memory management implemented by paging MMU 308. The memory management hierarchy begins with a formulation of a relative address from emulated CPU 302 that is applied to interface 320. Banking MMU 304 receives the relative address from interface 320 and, through the use of bank descriptor registers (not shown), produces an n-bit wide absolute address to be applied to interface 312. Paging MMU 308 receives the n-bit absolute address from banking MMU 304 to finally produce the m-bit real address applied to interface 314. In other words, banking MMU 304 defines an n-bit virtual address space, which allows the provisioning of the user application to a relatively high level position in memory. The high level memory position thus allows relatively easy memory expansions to the user application by simply allocating memory pages to the address space.

Address translations performed by software emulated MMU 316 are performed sequentially. That is to say, that a first step of address conversion involves the conversion of a relative address on interface 320 to the absolute address on interface 312. The first step being followed by a second step of converting the absolute address on interface 312 to a real address on interface 314. The address conversion diagram as illustrated in FIG. 3 is, therefore, a two-step, sequential calculation, which represents a significant part of the emulated address path length, the reduction of which is one advantage provided by the present invention.

For the purposes of illuminating the high level functionality of the address translation unit of FIG. 3, and example will now be explored, in which an executive (not shown) is used to define the address map and other environment variables to be used when emulated CPU 302 executes a user program. A user program executing on emulated CPU 302 is allowed, for example, a relative address space that may be defined, for example, with an 18 bit address bus. The user program, therefore, comprises an address space that is virtually addressable by CPU 302 via address bus 320 or address bus 322, which for this example, consists of 262144 addressable locations in memory.

Bank Descriptor Registers (BDR) (not shown) are used by the address translation unit of FIG. 3 to define how the address translation from a relative address to a real address is to be implemented. The BDR contains three pertinent components defined as the upper limit, lower limit and base offset. The lower and upper limit components of the BDR define the address space that is allocated to that particular BDR. The amount of relative memory space used by the user program must fit within the limits defined by the lower and upper limit components of the BDR. In other words, the relative start address of the user's program, assuming that the user program's memory space builds from lower memory space to upper memory space, must be equal to or greater than the lower limit component. Additionally, the end address of the user program must not extend past the upper limit component of the BDR. The third component of the BDR is the base offset, which for example, may represent an absolute address or an NT virtual address. The absolute address requiring further translation to yield a physical address, where the NT address is already a physical address in the emulated application. Arbitrarily setting the base offset of the BDR to 10000008, for example, and establishing a lower limit of 10008 and an upper limit of 17778, the absolute address of the bank defined by the BDR is calculated by banking MMU 304 to be 10010008 for the lower limit 10017778 for the upper limit.

In an instruction read operation, for example, CPU 302 attempts to retrieve a real address from address translation cache 306, constituting a cache hit, by using four general steps. First, CPU 302 utilizes the middle portion of the relative program counter address to form a cache index (CI) as a lookup index into address translation cache 306 and utilizes the upper portion of the relative program counter address to form a tag for comparison with the relative address tag in the cache sets associated with the CI. Second, once the tag has been matched, i.e., the correct address bank has been located, then a comparison is made between the CPU validity key and the validity lock field associated with the cache entry to determine whether the cache entry has been invalidated. Third, once both the tag and key have been validated, the CPU compares the word select field of the relative address with the upper and lower limits of the cache entry to ensure that the limits defined by the BDR for the bank of interest has not been breached. Fourth, a flag is checked within the cache flags field to determine that a valid access operation is requested from the CPU. Once all four checks have been passed, a valid physical/real address field is added to the word select field of the relative address to form the actual physical/real address.

Figure 4:
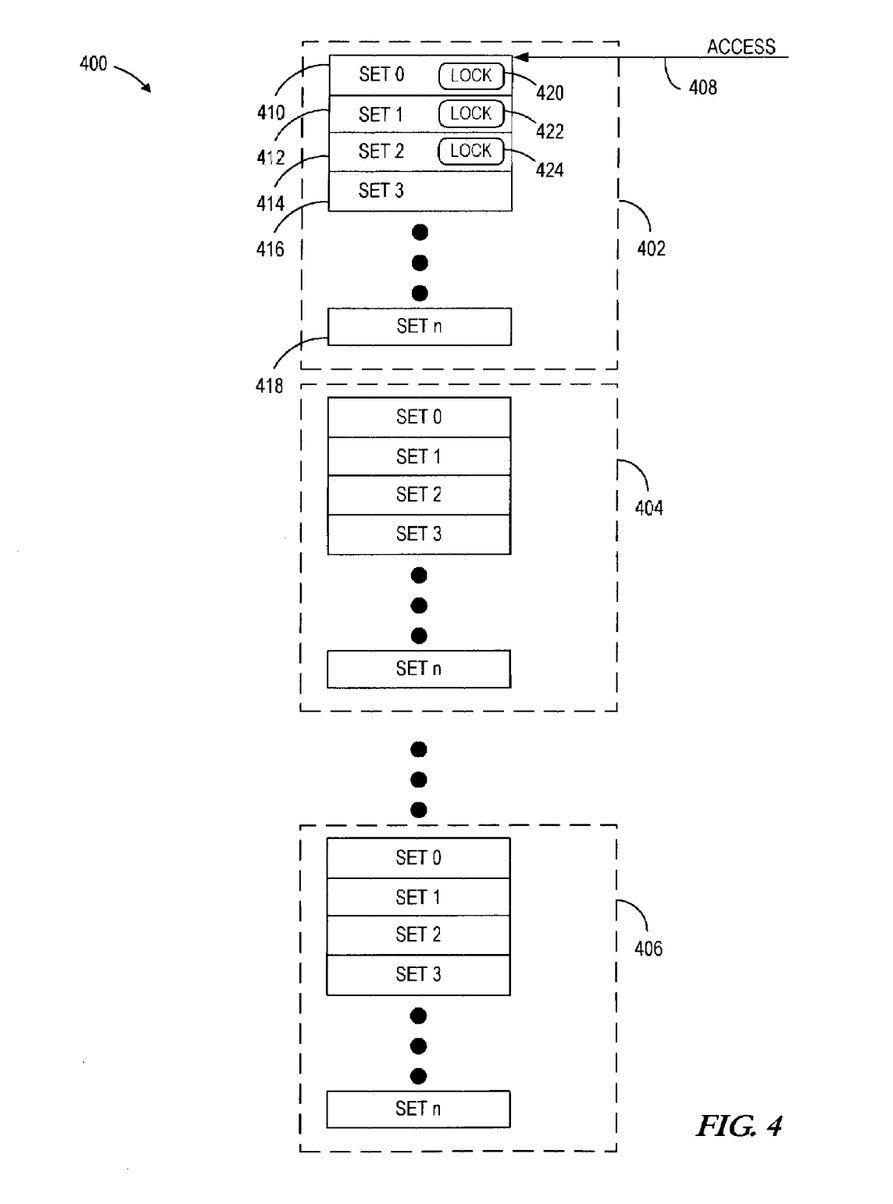
FIG. 4 is a block diagram of the arrangement of multiple cache sets existing within an address translation cache according to the present invention.

FIG. 4 illustrates an exemplary block diagram of the layout of address translation cache 400 such as may be implemented for use in address translation cache 306 in FIG. 3. Cache 402 may be subdivided into any number of cache indices 402, 404, and 406. The number is based on the number of bits of the relative address used to form the CI, e.g., a 9 bit address yields 512 cache indices. Each cache index may be subdivided into any number of cache sets 410 through 418. The cache sets may be partitioned according to the particular type of addressing being performed, e.g., two cache sets reserved for instruction fetch addressing and two cache sets for operand fetch addressing, etc. The cache sets may further be partitioned between Bank Descriptor Register groups and may be logically embodied within emulated CPU 302 of FIG. 3. Alternately, every address translation contained in cache 400 may be invalidated by incrementing the CPU validity key, so that the validity key no longer matches the validity lock fields 420, 422, and 424 represented in each cache set. Although only 3 validity lock fields are illustrated, a validity lock field exists for each cache set illustrated in FIG. 4. Once invalidated, cache 400 is rebuilt with new translations as required and described below in relation to the flow diagram of FIG. 6. Each entry of every cache set may be accessed via access bus 410, comprising, for example, a 24-bit wide relative address bus, as illustrated for example, by interface 322 in FIG. 3. In operation, address translation cache 400 stores previous address translations in order to accelerate future address associated operations using the same address space defined within the cache.

Figure 5:
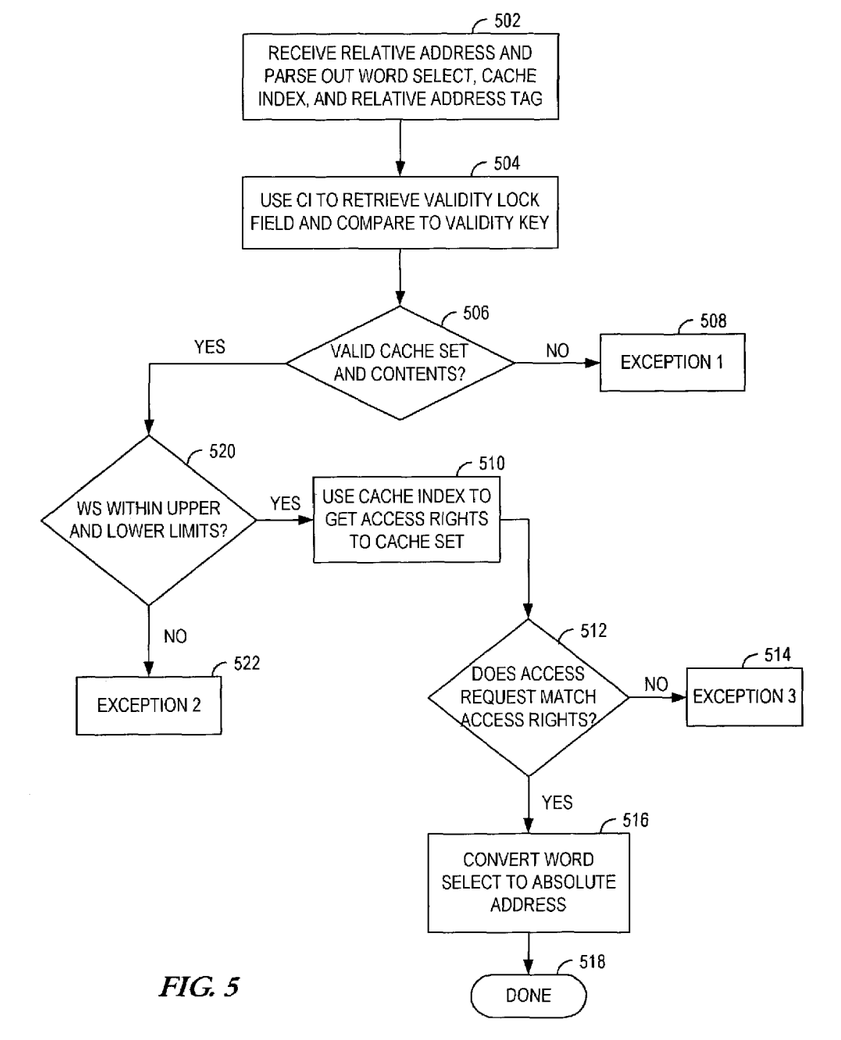
FIG. 5 illustrates a flow diagram of an address translation for an address instruction fetch in accordance with the present invention.

FIG. 5 illustrates an exemplary flow diagram of an address fetch operation from the address cache illustrated in FIG. 4 from the emulated CPU 302 as illustrated in FIG. 3. For illustration purposes only, the address fetch represents a basic mode instruction read, whereby the address presented on the access bus is generated from a Program Counter (PC) within emulated CPU 302. As discussed above, the width of the access bus may be any size, and the advantages of the present invention may be realized for any width dimension of access bus 424.

In step 502, a relative address is received from the PC located within emulated CPU 302. The relative address is then parsed into Word Select (WS), Cache Index (CI) and Relative Address Tag (RAT) components, where the RAT represents the upper most significant bits of the relative address applied to access bus 410, the CI represents the middle most significant bits, and the WS represents the least significant bits of the relative address. For example, if the PC counter pointed to address location $000123456_8$, then the upper nibble, $000_8$, represents the RAT, the middle nibble, $123_8$, represents the CI and the lower nibble, $456_8$, represents the WS. A Designated Register Bit (DRB) (not shown) may also be copied into the RAT for search order validity reasons. For example, if the value of the RAT is equal to zero, the DRB is equal to zero, and the RAT field for cache set 410 or cache set 412 of FIG. 4 is equal to zero, then cache set 410/412 is the target cache set for the first pass. If, however, cache sets 410/412 is not the cache containing the desired address such that the first pass does not produce a cache hit, then the DRB would merely have to be toggled in order to, for example, research the contents of cache sets 410/412 for the desired address before processing as a miss.

The CI, or cache tag, represents an index into the cache to select a group of cache sets that is the subject of the current pass, such that cache set group located at address $123_8$ of the current cache set is accessed. Once cache segment $123_8$ has been accessed, the validity lock field for that cache segment is compared to the validity key within the CPU state at step 504 for equality. If the validity lock field is equal to the validity key and if the current cache set is the correct cache set as determined in step 506, then operation transfers to step 520, otherwise exception 1 is executed at step 508. The contents contained within the cache segment of cache set 410 are said to be valid at step 520, where the WS is then compared to the upper and lower address limits of the current cache set. If the WS is within the address limits, then operation transfers to 510 to retrieve the access rights bit field of the cache set from the BDR associated with the current cache set, otherwise exception 2 is executed at step 522.

Once the proper cache set and the validity of the cache set contents are verified, and the WS is verified to exist between the upper and lower limits contained in the cache set, a check on the access rights is performed at step 512. If the access rights bit field is set for read access only, for example, and if the bank accessed is a write-only bank, the operation is not allowed and exception 3 is taken at step 514. If, however, proper access has been verified, then the NT virtual address of the cache segment is retrieved, the WS is appropriately shifted, if necessary, and then added to the NT virtual address just retrieved to create a physical/real address at step 516 and execution completes at step 518. A shift of the WS may be necessary, for example, if the WS does not align with the NT virtual address space definition.

The exception free operation of the above example yields a substantially rapid verification of a cache hit, which yields a shortened path length and represents one advantage in accordance with the present invention. Although an NT virtual address target is specified in the above example, it should be known to one of ordinary skill in the art, that any virtual address target may be used in relation to any OS, such as for example, UNIX, VMS or even Reduced Instruction Set Computer (RISC) architectures.

Exception 1 at step 508 may result, for example, if the validity key of the CPU state does not equal the validity lock contained within the cache segment of the current cache set. In this instance, the DRB may be toggled from a value of 0 to a value of 1, for example, whereby the same cache set may be quickly researched for a cache hit. If the RAT field is equal to RAT and new DRB value, then the operation continues as before starting with step 520 as discussed above. One advantage of the present invention, therefore, provides the ability to dynamically toggle between cache sets when a cache miss occurs. If a cache miss, however, occurs for all cache sets, then MMU 316 of FIG. 3 is required to perform an address translation because the address translation can not be found in the address translation cache of FIG. 4.

Figure 6:
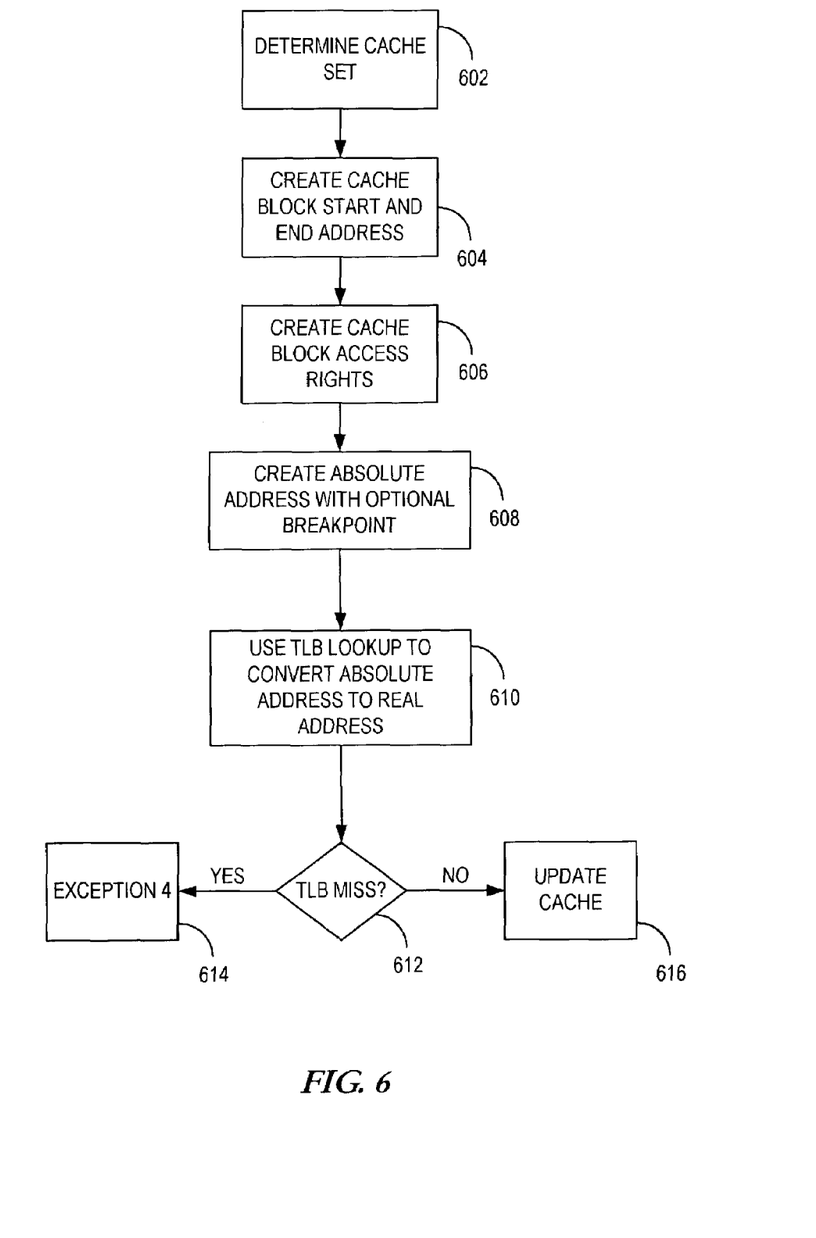
FIG. 6 illustrates an address translation calculation after a cache miss.

FIG. 6 illustrates an exemplary flow diagram of an emulated MMU address translation according to the present invention when the address fetch corresponding to the PC contents for an instruction read has resulted in a cache miss for all cache sets. Prior to performing an address translation on the PC address provided by CPU 302, the correct cache set, as illustrated in FIG. 4 for example, is first located in step 602. The individual cache set in the cache set pair is selected based on which of the last set in the pair was last written. In other words, the cache set having the oldest data is selected. Next, the appropriate BDR is selected according to one of two modes. One mode searches limits defined by four BDRs and selects the first BDR having upper and lower limits that encompass the relative address, where the BDR search order is specified by a DRB in the CPU. In another mode of operation, the instruction read access always selects BDR zero, while operand access has a specific 'B' field located in each instruction word that accesses main storage.

Next, the cache block start address for the user instruction must be calculated as in step 604. The received PC address is first masked such that only the CI and RAT portions, e.g. $000123_8$ as discussed above, of the PC address are available. Once masked, the RAT and CI portion of the address is then subtracted from the upper limit of the selected BDR yielding the number of words in the bank above the beginning address of the cache block. If the number of words is greater than 511, for example, then the value is set to 511 and the value, plus 1, is stored as the cache block upper limit. The selected BDR lower limit least significant bits, e.g., the number of bits in the word select field, is transferred to cache block lower limit. There may, however, be cases where the cache block straddles a page boundary. In these cases, the cache block limits are adjusted so that the cache entry remains within a single page. These precautions are taken so that the cache block represented by the PC address may be wholly encompassed within a single storage page.

Next, in step 606, the access rights to the cache block are set according to the access key passed in by CPU 302 of FIG. 3 or by the access right flags contained within the BDR for the particular cache set. If the access key passed in by CPU 302 is equal to zero, for example, then the access rights given by the cache block are for both read and write access. If the access key is not zero, then the access rights to the cache block are set according to the value of the access rights flags contained within the BDR for that cache set. Ring and Domain algorithms executing within CPU 302 to provide General Access Permissions (GAP) and Special Access Permissions (SAP) are effectively bypassed through the miss processing within step 606 because read and write access rights have already been calculated through the use of the access key passed in by CPU 302 or by the access right flags contained within the BDR for the particular set.

Next, at step 608, an absolute address for the cache block is calculated by adding the offset field associated with the BDR of the selected cache set to the PC offset address passed in by CPU 302 and then subtracting from the absolute address, the WS portion of the PC address passed in by CPU 302. Once the absolute address has been calculated, breakpoint access is optionally provided within the cache block itself. Not every absolute address within the cache block is checked for breakpoints. Rather, a break point absolute tag is generated and a comparison between the break point absolute tag and the word count range of the cache block is executed. If the break point absolute tag does not fall within the word count range of the cache block, then no further breakpoint processing is performed. If, however, a breakpoint does exist, then further breakpoint processing is performed within the cache block to check for a breakpoint on this access and setup the cache block limits for exception processing on future accesses. The breakpoint may be used, for example, as a standard maintenance function, whereby the CPU execution halts once the attributes of the breakpoint have been met. The attributes of the breakpoint may include, for example, a read match for a particular address location, a write match for a particular address location or an instruction match.

Next, in step 610, a real address is calculated from the absolute address by first generating an Absolute Address Tag (AAT) from the absolute address calculated in step 608. The AAT is generated from the upper nibble of the absolute address created in step 608. Additionally, a TLB index is generated from the middle nibble of the absolute address. The AAT and the TLB index are used in a fashion similar to the table lookup discussed in relation to FIG. 2, except that a two-level lookup is required. Previous absolute address to physical/real address translations are stored in the TLB, addressable through the use of the TLB index. If the correct TLB has been located, as indicated by the Yes branch of step 612, then the validity lock contained within the TLB equates to the validity key and the execution progresses to step 616, otherwise exception 4 is generated at step 614. Once the correct TLB for the cache set has been accessed, then the AAT is used to compare with the AAT field stored in this TLB entry to find the real address associated with the absolute address passed in by Paging MMU 308. The TLB, therefore, also represents a cache that contains real addresses that point to the memory array that may be defined by main memory 310 of FIG. 3. The real address contained within the TLB may or may not need further translation to directly address main memory 310 depending upon the particular architecture implemented.

It can be seen, therefore, that once the processing of FIG. 6 has been completed, Address Translation Cache 306 of FIG. 3 contains address translations as opposed to data. The address translations contain the correct BDR selection based on the BDR search discussed above. Additionally, the address translations provide a relative address limit check and an access privilege check. Both absolute and real addresses are generated within the address translation as well as any breakpoint information required for the translation.

Although the present invention has been described in relation to the use of multiple user accessible cache sets, the present invention may also be realized when only a single cache set pair is available to the user, such as would be the case, for example, in an extended mode address fetch. In extended mode operation, a single cache set pair, cache set 410/412 of FIG. 4 for example, is used for all instruction address translations and the use of base registers is needed to completely describe which of the other cache sets, 412-418 of FIG. 4 for example, contain the real/physical translations. Each user instruction read contains a B-field that indicates which base register would be used to augment the partial CI portion of the operand address. In other words, in extended mode addressing, some of the bits of the current instructions B field are used to augment the CI portion of the instruction's address to completely define which cache set the instruction's address resides.

In conclusion, the features of the present invention may be used to significantly decrease the amount of time required to execute instructions on a software emulated platform. Such a software emulated platform, taking advantage of the address translation cache described herein may, for example, realize a significant performance improvement in the Mega Instruction Per Second (MIPS) achievable by such an emulation system. Additionally, the advantages afforded by the present invention complement the use of multi-processor emulation systems, since the address translation cache is unique to each processor.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of using a relative address translation cache for address translation, comprising:
  locating a cache index corresponding to a relative address value;
  comparing a validity key received from an emulated CPU to a validity lock associated with the cache index to determine validity of the cache index;
  parsing the relative address value into a plurality of components; and
  deriving an absolute address from the relative address value using the relative address translation cache if the cache index is determined to be valid, wherein deriving the absolute address includes verifying that one of the parsed components is within upper and lower limits of a selected cache set identified by the cache index, checking access rights to the selected cache set, and converting the verified one of the parsed components into the absolute address.

2. The method according to claim 1, wherein parsing the relative address value into a plurality of components comprises parsing the relative address value into first, second and third components, and wherein locating the cache index comprises using the second component as the cache index to select a group of cache sets.

3. The method according to claim 1, wherein comparing the validity key to the validity lock comprises:
  selecting a first cache set within the cache index;
  comparing a validity lock value associated with the first cache set to the validity key; and
  declaring a first cache miss in response to a first failed comparison.

4. The method according to claim 3, further comprising:
  selecting a second cache set within the cache index in response to the first cache miss;
  comparing a validity lock value associated with the second cache set to the validity key; and
  declaring a second cache miss in response to a second failed comparison.

5. The method according to claim 3, wherein selecting the first cache set comprises:
  copying a designated register bit into the first component;
  comparing the first component to a corresponding component in the first cache; and
  selecting the first cache set in response to a successful comparison.

6. The method according to claim 5, wherein selecting the second cache set comprises:
  toggling the designated register bit;
  comparing the first component to a corresponding component in the second cache; and
  selecting the second cache set in response to a successful comparison.

7. The method according to claim 1, wherein verifying that one of the parsed components is within upper and lower limits of a selected cache set further comprises checking for breakpoint processing in response to the verified one of the parsed components existing outside the upper limit.

8. The method according to claim 1, wherein verifying that one of the parsed components is within upper and lower limits of a selected cache set further comprises checking for breakpoint processing in response to the verified one of the parsed components existing outside the lower limit.

9. A hardware emulation system, comprising:
  an emulated memory management unit coupled to receive relative addresses and arranged to determine relative address limits of an address space of each memory access, to verify access permissions, and to provide address translations corresponding to the relative addresses;
  an address translation cache coupled to store the address translations having acceptable relative address limits and verified access permissions;
  an emulated CPU for providing the relative addresses requiring translation, wherein the emulated CPU receives the address translations from the address translation cache when the address translation cache is valid and receives the address translations from the emulated memory management unit when the address translation cache is not valid; and
  wherein the address translation cache comprises a validation lock, means for receiving a validation key from the emulated CPU, means for comparing the validation lock to the validation key to determine the validity state of the address translation cache, and means for invalidating the entire address translation cache.

10. The hardware emulation system of claim 9, wherein the validity state is determined to be invalid in response to unequal values of validation lock and validation key.

11. The hardware emulation system of claim 9, wherein the validity state is determined to be valid in response to equal values of validation lock and validation key.

12. A method of generating an address translation entry to facilitate relative address to real address translation, comprising:

selecting a cache set corresponding to the relative address;

generating attributes of the address translation entry, the attribute generation including:

defining boundary limits of a cache block within the cache set by locating a bank descriptor register having upper and lower limits that encompass the relative address using a search order of bank descriptor registers defined by at least one designated register bit;

defining access rights to the cache block; and generating an indication of a breakpoint within the cache block; and generating a real address using the attributes of the address translation entry.

13. The method according to claim 12, wherein selecting the cache set is determined to be the cache set least recently written.

14. The method according to claim 12, wherein defining boundary limits of the cache block within the cache set further comprises:

parsing the relative address into first, second, and third components;

combining the first and second components with the upper limit of the bank descriptor register to define the upper limit of the cache block; and using the third component to define the lower limit of the cache block.

15. The method according to claim 12, wherein defining access rights to the cache block comprises:

receiving an access request from an emulated CPU;

determining read access from the access request; and determining write access from the access request.

16. The method according to claim 12, wherein defining access rights to the cache block comprises:

receiving an access request from an emulated CPU;

determining read access from the bank descriptor register; and determining write access from the bank descriptor register.

17. The method according to claim 12, wherein generating an indication of a breakpoint within the cache block comprises:

generating a break point absolute tag; and comparing a word count range of the cache block to the absolute tag.

18. The method according to claim 17, further comprising locating a location of the breakpoint when the break point absolute tag falls within the word count range of the cache block.

19. The method according to claim 17, further comprising bypassing breakpoint processing when the break point absolute tag falls outside the word count range of the cache block.

20. The method according to claim 12, wherein generating a real address from the relative address comprises:

calculating an absolute address from the relative address; and calculating the real address from the absolute address.

21. The method according to claim 20, wherein calculating the absolute address comprises:

adding an offset field contained within a bank descriptor register to an offset address passed in by an emulated CPU; and subtracting a portion of the relative address.

22. The method according to claim 21, wherein calculating the real address from the absolute address comprises:

generating an absolute address tag from the absolute address;

generating an index from the absolute address; and using the absolute address tag and the index to perform a two-level lookup for the real address.

* * * * *